(12) United States Patent
Ichimoto

(10) Patent No.: US 7,882,698 B2
(45) Date of Patent: Feb. 8, 2011

(54) INTERNAL COMBUSTION ENGINE APPARATUS, CONTROL METHOD THEREOF, AND VEHICLE

(75) Inventor: Kazuhiro Ichimoto, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 648 days.

(21) Appl. No.: 12/007,938

(22) Filed: Jan. 17, 2008

(65) Prior Publication Data

US 2008/0236148 A1 Oct. 2, 2008

(30) Foreign Application Priority Data

Mar. 28, 2007 (JP) .............................. 2007-084736

(51) Int. Cl.
*F01N 3/00* (2006.01)
*F01N 3/10* (2006.01)
*F01N 1/00* (2006.01)

(52) U.S. Cl. .............................. 60/288; 60/274; 60/287; 60/299; 60/324

(58) Field of Classification Search .................. 60/274, 60/287, 288, 292, 296, 299, 324
See application file for complete search history.

(56) References Cited

U.S. PATENT DOCUMENTS

| | | | | |
|---|---|---|---|---|
| 3,908,366 A | * | 9/1975 | Masaki | 60/277 |
| 3,965,677 A | * | 6/1976 | Goto et al. | 60/277 |
| 4,128,998 A | * | 12/1978 | Hattori et al. | 60/277 |
| 5,647,206 A | | 7/1997 | Yamamoto et al. | |
| 2005/0220679 A1 | * | 10/2005 | Choi | 422/177 |
| 2008/0120019 A1 | * | 5/2008 | Inoue et al. | 701/113 |

FOREIGN PATENT DOCUMENTS

| | | |
|---|---|---|
| CN | 1680693 A | 10/2005 |
| JP | 06-101451 A | 4/1994 |
| JP | 2000-345829 A | 12/2000 |
| JP | 2000345829 A * | 12/2000 |
| JP | 2006-266253 A | 5/2006 |
| JP | 2006-291916 A | 10/2006 |

OTHER PUBLICATIONS

Ito et al, English Abstract of JP 2000-345829 A, Dec. 12, 2000.*

* cited by examiner

*Primary Examiner*—Thomas E Denion
*Assistant Examiner*—Audrey Klasterka
(74) *Attorney, Agent, or Firm*—Kenyon & Kenyon LLP

(57) ABSTRACT

When a misfire occurs in any cylinder of an engine, an exhaust switching valve is closed to pass exhaust gas through an HC adsorbing section to a catalytic purifying section having a three-way catalyst (step S130). Thus, unburned fuel (HC) mixed in the exhaust gas due to a misfire of the engine can be adsorbed in the HC adsorbing section. Accordingly, unburned fuel (HC) due to a misfire after the start of the engine is completed can be prevented from being exhausted.

7 Claims, 3 Drawing Sheets

INTERNAL COMBUSTION ENGINE APPARATUS, CONTROL METHOD THEREOF, AND VEHICLE

BACKGROUND

1. Technical Field

The present invention relates to an internal combustion engine apparatus, a control method thereof, and a vehicle, and more specifically to an internal combustion engine apparatus having an internal combustion engine, a control method thereof, and a vehicle having the internal combustion engine apparatus mounted thereon.

2. Related Art

Conventionally, there has been proposed such an internal combustion engine apparatus in which a bypass passage is provided in an exhaust passage downstream of a muffler in the exhaust system of the internal combustion engine, and an adsorbent for adsorbing a fuel of the internal combustion engine is disposed in the bypass passage such that an exhaust gas may flow through the bypass passage if a condition is satisfied (for example, see Japanese Patent Laid-Open No. H6-101451). In this apparatus, the condition is satisfied if the cooling water temperature of the internal combustion engine is equal to or less than 60 degrees centigrade, a fuel cut operation has not been carried out, no misfire has occurred, and the temperature of an adsorbent for adsorbing a fuel of the internal combustion engine is less than 300 degrees centigrade at a time less than 100 seconds from the time when the internal combustion engine started operation. If the condition is satisfied, a valve operation is performed so as to pass the exhaust gas through the bypass passage. If the condition is not satisfied, a valve operation is performed so as to prevent the exhaust gas from passing through the bypass passage.

There has also been proposed another internal combustion engine apparatus in which a second purifying device which includes an adsorption section having an adsorbent for adsorbing a fuel of the internal combustion engine, and a purifying section having a three-way catalyst downstream of this adsorption section is provided in an exhaust passage downstream of a purifying device having a three-way catalyst of an exhaust system of the internal combustion engine (for example, see Japanese Patent Laid-Open No. 2006-291916). In this apparatus, when the internal combustion engine is started, an exhaust gas is controlled to pass through the adsorption section to the purifying section during the time period from the time when the cranking was started until a predetermined time elapsed; and after the predetermined time elapsed, most of the exhaust gas is controlled to pass through the purifying section to be exhausted, thereby preventing unburned fuel from being directly exhausted at the time of starting.

SUMMARY

As the aforementioned internal combustion engine apparatus, in an internal combustion engine apparatus having an adsorbent for adsorbing unburned fuel in the exhaust system, neither unburned fuel remaining in a crank case at the time of start of the internal combustion engine nor a fuel which has not been ignited is exhausted directly, but there is still unburned fuel which may be exhausted even after the start of the internal combustion engine is completed.

The internal combustion engine apparatus, a control method thereof, and a vehicle having the internal combustion engine apparatus mounted thereon in accordance with the present invention has an object to prevent unburned fuel from being exhausted after the start of the internal combustion engine is completed.

The internal combustion engine apparatus, a control method thereof, and a vehicle in accordance with the present invention employs the following means to accomplish at least a part of the above object.

The present invention is directed to an internal combustion engine apparatus which has an internal combustion engine. The internal combustion engine apparatus includes: an exhaust gas purifying unit which is provided in an exhaust system of the internal combustion engine and which includes a purifying catalytic section having a purifying catalyst for purifying an exhaust gas, a fuel gas adsorbing section having a fuel gas adsorbent for adsorbing a fuel gas in the exhaust gas and a passage switching section for switching between a first passage for passing the exhaust gas mainly to the purifying catalytic section and a second passage for passing all the exhaust gas through the fuel gas adsorbing section to the purifying catalytic section; a misfire judgment unit for judging whether or not a misfire occurs in any cylinder of the internal combustion engine; and an in-misfire switching control unit for controlling the passage switching section such that when the misfire judgment unit judges that a misfire occurs in any cylinder of the internal combustion engine, the passage switching section passes the exhaust gas to the second passage.

According to the internal combustion engine apparatus of the present invention, when a misfire occurs in any cylinder of the internal combustion engine, a passage switching section is controlled to pass the exhaust gas to a second passage by switching between a first passage for passing the exhaust gas mainly to a purifying catalytic section and a second passage for passing all the exhaust gases through a fuel gas adsorbing section to a purifying catalytic section. Thus, unburned fuel can be prevented from being exhausted when a misfire occurs in any cylinder of the internal combustion engine.

In one preferable embodiment of the internal combustion engine apparatus of the invention, the purifying catalytic section of the exhaust gas purifying unit may be located in an entire downstream of an exhaust passage and the fuel gas adsorbing section of the exhaust gas purifying unit may be located in a part of an upstream of the exhaust passage; and the passage switching section of the exhaust gas purifying unit may be disposed in a remaining portion of the upstream of the exhaust passage of the exhaust gas purifying unit and may have a valve for opening and closing the remaining portion. In this embodiment, only a valve operation is enough for switching between a first passage and a second passage.

In another preferable embodiment of the internal combustion engine apparatus of the invention, the internal combustion engine apparatus may include a second exhaust gas purifying unit located upstream of the exhaust gas purifying unit of the exhaust system of the internal combustion engine and has a purifying catalyst for purifying the exhaust gas. In this embodiment, an exhaust gas purifying unit should adsorb a fuel or purify an exhaust gas that cannot be purified by the second exhaust gas purifying unit. Thus the exhaust gas purifying unit can be configured to be small and compact.

The present invention is also directed to a vehicle. The vehicle includes: an internal combustion engine for outputting driving power; an exhaust gas purifying unit which is located in an exhaust system of the internal combustion engine and which includes a purifying catalytic section having a purifying catalyst for purifying an exhaust gas, a fuel gas adsorbing section having a fuel gas adsorbent for adsorbing a fuel gas in the exhaust gas and a passage switching section for switching between a first passage for passing the exhaust gas mainly to the purifying catalytic section and a second passage for passing all the exhaust gas through the fuel gas adsorbing section to the purifying catalytic section; a misfire judgment unit for judging whether or not a misfire occurs in any cylinder of the internal combustion engine; and an in-misfire switching control unit for controlling the passage switching section such that when the misfire judgment unit judges that a misfire occurs in any cylinder of the internal combustion engine, the passage switching section passes the exhaust gas to the second passage.

According to the vehicle of the present invention, when a misfire occurs in any cylinder of the internal combustion engine, a passage switching section is controlled to pass the exhaust gas to a second passage by switching between a first passage for passing the exhaust gas mainly to a purifying catalytic section and a second passage for passing all the exhaust gases through a fuel gas adsorbing section to a purifying catalytic section. Thus, unburned fuel can be prevented from being exhausted when a misfire occurs in any cylinder of the internal combustion engine.

In one preferable embodiment of the vehicle of the invention, the purifying catalytic section of the exhaust gas purifying unit may be located in an entire downstream of an exhaust passage and the fuel gas adsorbing section of the exhaust gas purifying unit may be located in a part of an upstream of the exhaust passage; and the passage switching section of the exhaust gas purifying unit may be disposed in a remaining portion of the upstream of the exhaust passage of the exhaust gas purifying unit and may have a valve for opening and closing the remaining portion. In this embodiment, only a valve operation is enough for switching between a first passage and a second passage.

In another preferable embodiment of the vehicle of the invention, the vehicle may include a second exhaust gas purifying unit located upstream of the exhaust gas purifying unit of the exhaust system of the internal combustion engine and has a purifying catalyst for purifying the exhaust gas. In this embodiment, an exhaust gas purifying unit should adsorb a fuel or purify an exhaust gas that cannot be purified by the second exhaust gas purifying unit. Thus the exhaust gas purifying unit can be configured to be small and compact.

The present invention is also directed to a control method of an internal combustion engine apparatus. The internal combustion engine includes an internal combustion engine; an exhaust gas purifying unit which is located in an exhaust system of the internal combustion engine and which includes a purifying catalytic section having a purifying catalyst for purifying an exhaust gas, a fuel gas adsorbing section having a fuel gas adsorbent for adsorbing a fuel gas in the exhaust gas and a passage switching section for switching between a first passage for passing the exhaust gas mainly to the purifying catalytic section and a second passage for passing all the exhaust gas through the fuel gas adsorbing section to the purifying catalytic section. The control method controls the passage switching section such that when a misfire occurs in any cylinder of the internal combustion engine, the passage switching section passes the exhaust gas to the second passage.

According to the control method of an internal combustion engine apparatus of the present invention, when a misfire occurs in any cylinder of the internal combustion engine, a passage switching section is controlled to pass the exhaust gas to a second passage by switching between a first passage for passing the exhaust gas mainly to a purifying catalytic section and a second passage for passing all the exhaust gases through a fuel gas adsorbing section to a purifying catalytic section. Thus, unburned fuel can be prevented from being exhausted when a misfire occurs in any cylinder of the internal combustion engine.

DESCRIPTION OF THE PREFERRED EMBODIMENTS

Figure 1:
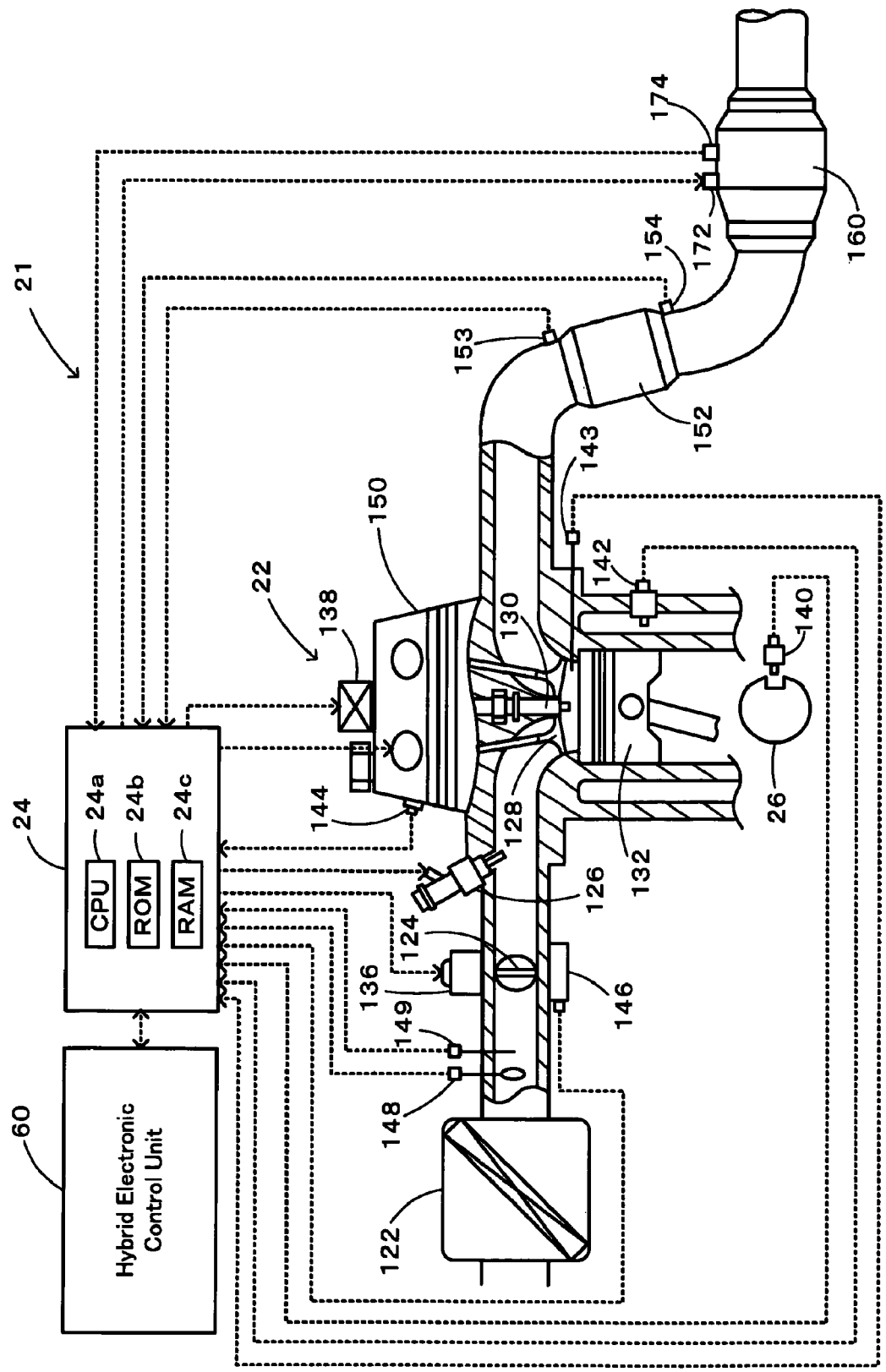
FIG. 1 is a schematic diagram showing a configuration of an internal combustion engine apparatus 21 in accordance with an embodiment of the present invention.
Figure 2:
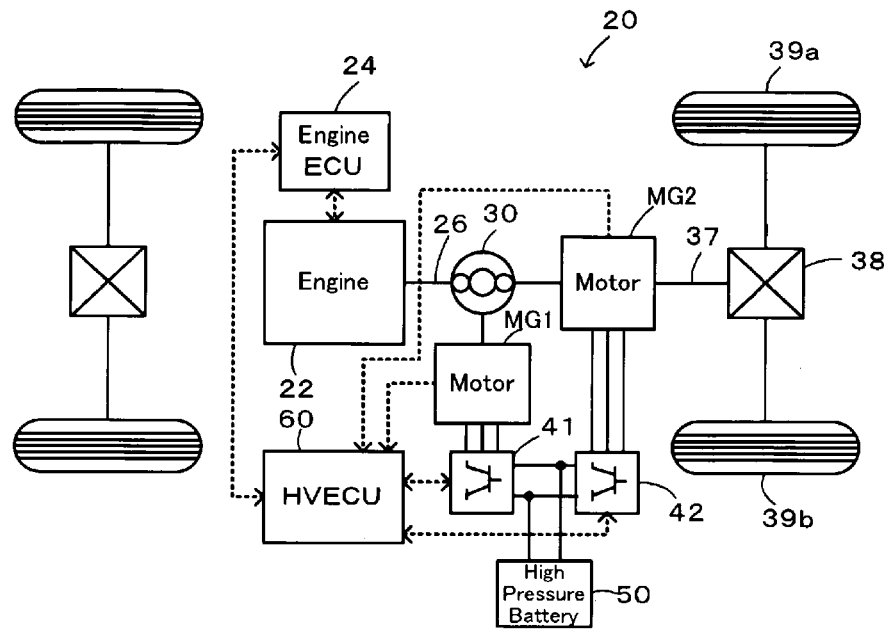
FIG. 2 is a schematic diagram showing a configuration of a hybrid vehicle 20 having the internal combustion engine apparatus 21 mounted thereon in accordance with an embodiment of the present invention.
Figure 3:
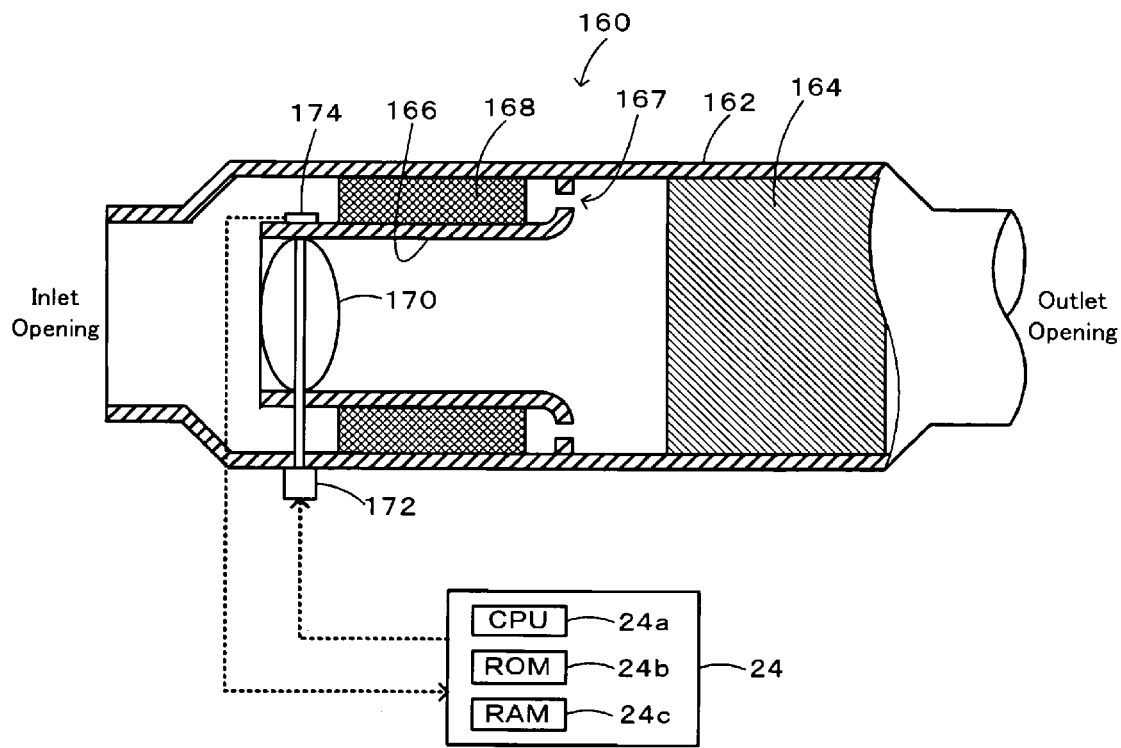
FIG. 3 is a schematic diagram showing a configuration of a second purifying device 160 mounted on the internal combustion engine apparatus 21 in accordance with an embodiment of the present invention.

Next, the best mode for carrying out the present invention will be described. FIG. 1 is a schematic diagram showing a configuration of an internal combustion engine apparatus 21 in accordance with an embodiment of the present invention. FIG. 2 is a schematic diagram showing a configuration of a hybrid vehicle 20 having the internal combustion engine apparatus 21 mounted thereon in accordance with an embodiment of the present invention. FIG. 3 is a schematic diagram showing a configuration of a second purifying device 160 mounted on the internal combustion engine apparatus 21 in accordance with an embodiment of the present invention.

A hybrid vehicle 20 having an internal combustion engine apparatus 21 mounted on in accordance with an embodiment of the present invention as shown in FIG. 2, includes an engine 22; an engine electronic control unit (hereinafter referred to as an engine ECU) 24 for performing an operation control of this engine 22; a power distribution and integration mechanism 30 including a planetary gear having a carrier coupled to a crank shaft 26 of the engine 22, and also having a ring gear coupled to a drive shaft 37 connected via a differential gear 38 to drive wheels 39a and 39b; a motor MG1 which is connected to a sun gear of the power distribution and integration mechanism 30 and can generate electric power; a motor MG2 which outputs and inputs mechanical power to a drive shaft 37 and can generate electric power; inverters 41 and 42 serving as drive circuits of motors MG1 and MG2; a high pressure battery 50 for supplying electric power to the inverters 41 and 42; and a hybrid electronic control unit (hereinafter referred to as an HVECU) 60 for controlling the entire vehicle. Mechanical power output from the engine 22 is subjected to torque conversion by the power distribution and integration mechanism 30, and two motors MG1 and MG2 accompanying charge and discharge of the high pressure battery 50 and then output to a drive shaft 37 for driving, or in a state where the engine 22 is stopped, electric power from the high pressure battery 50 is used to rotate the motor MG2 and then, only the mechanical power from the motor MG2 is output to the drive shaft 37 for driving.

The internal combustion engine apparatus 21 mounted on such a hybrid vehicle 20, as shown in FIG. 1, includes a 6 cylinder engine 22 configured as an internal combustion engine capable of outputting mechanical power using hydrocarbon based fuels such as gasoline and diesel fuels; a first purifying device 152 and a second purifying device 160 attached to the exhaust system; and an engine ECU 24 for controlling the entire internal combustion engine apparatus 21 including the engine 22.

Air cleaned by an air cleaner 122 is passed through a throttle valve 124 to the engine 22. A fuel injection valve 126 is opened to inject gasoline into the cleaned air and then the air and gasoline are mixed. The air-fuel mixture is fed into a combustion chamber through an intake valve 128 and is explosively burnt by an electric spark of a spark plug 130. The energy pushes a piston 132 down, and its reciprocating motion is converted to a rotational motion of a crank shaft 26. The exhaust gas discharged from the engine 22 is introduced into a first purifying device 152 having a three-way catalyst for removing harmful components such as carbon monoxide (CO), hydrocarbon (HC), and nitrogen oxide (NOx), and then introduced into a second purifying device 160 having an HC adsorption section for adsorbing unburned fuel (hereinafter referred to as "HC") to be released to the atmosphere.

The second purifying device 160, as shown in FIG. 3, includes a widened cylindrical outer case 162; an inner case 166 which is located approximately half way from the exhaust inlet opening inside the outer case 162 and which forms a cylindrical passage in the middle and forms an annular space inside the outer case 162; a cylindrical HC adsorbing section 168 which is located in the annular space formed between the outer case 162 and the inner case 166 and which has an adsorbent for adsorbing unburned fuel; a catalytic purifying section 164 which is located approximately half way from an exhaust outlet opening inside the outer case 162 and which has an aforementioned catalyst (three-way catalyst); an exhaust switching valve 170 attached to the exhaust inlet inside the inner case 166; and an actuator 172 which opens and closes the exhaust switching valve 170. The exhaust outlet end of the inner case 166 is attached to the outer case 162 and a plurality of through-holes 167 are formed in the vicinity of this end. Accordingly, when the exhaust switching valve 170 is closed, the exhaust gas fed into the second purifying device 160 is passed through the annular space having an HC adsorbing section 168 and a plurality of through-holes 167 to the catalytic purifying section 164 to be discharged through the outlet. In other word, the exhaust gas is passed through the HC adsorbing section 168 and then to the catalytic purifying section 164 to be discharged. On the other hand, when the exhaust switching valve 170 is opened, most of the exhaust gas is passed through the exhaust switching valve 170 directly to the catalytic purifying section 164 to be discharged; and part of the exhaust gas is passed through the HC adsorbing section 168 and then to the catalytic purifying section 164 to be discharged. The three-way catalyst of the catalytic purifying section 164 includes an oxidation catalyst such as platinum (Pt) and palladium (Pd); a reduction catalyst such as rhodium (Rh); a cocatalyst such as ceria (Ceo2) and the like. The oxidation catalyst which is activated at high temperatures oxidizes carbon monoxide (CO) and unburned hydrocarbons (HC) into water (H2O) and carbon dioxide (CO2); the reduction catalyst breaks nitrogen oxide (NOx) down into nitrogen (N2) and oxygen (O2). An HC adsorbent of the HC adsorbing section 168, which is made up of zeolite, adsorbs HC at low temperatures, and desorbs HC adsorbed at high temperatures. Accordingly, when the exhaust switching valve 170 is closed, the HC adsorbing section 168 adsorbs HC temporarily, and later with an increase in temperature of the HC adsorbing section 168, the adsorbed HC can be released.

The engine ECU 24 is constructed as a microprocessor centered on a CPU 24a. In addition to the CPU 24a, the engine ECU 24 includes a ROM 24b for storing processing programs, a RAM 24c for storing data temporarily, input-output ports and communication ports (not shown). The engine ECU 24 receives signals from various sensors for detecting states of the engine 22 via the input ports. For example, such signals include a crank position from a crank position sensor 140 for detecting a rotational position of the crank shaft 26; a cooling water temperature from a water temperature sensor 142 for detecting a cooling water temperature of the engine 22; an in-cylinder pressure Pin from a pressure sensor 143 attached inside the combustion chamber; a cam position from a cam position sensor 144 detected as the rotational position of a camshaft driven to open and close the intake valve 128 and an exhaust valve for gas intake and exhaust into and from the combustion chamber; a throttle position from a throttle valve position sensor 146 for detecting a position of the throttle valve 124; an air flow meter signal from an air flow meter 148 attached to an intake pipe; an intake temperature from a temperature sensor 149 also attached to the intake pipe; an air-fuel ratio from an air-fuel ratio sensor 153; an oxygen signal from an oxygen sensor 154; and an exhaust switching valve position from an exhaust switching valve position sensor 174 for detecting a position of the exhaust switching valve 170. The engine ECU 24 outputs various control signals for driving the engine 22 via an output port. Such output signals include a drive signal to the fuel injection valve 126; a drive signal to a throttle motor 136 for adjusting a position of the throttle valve 124; a control signal to an ignition coil 138 formed integrally with an igniter; a control signal to a variable valve timing mechanism 150 capable of changing the timing of opening and closing the intake valve 128; and a drive signal to an actuator 172. It should be noted that the engine ECU 24 communicates with a hybrid electronic control unit 60 so as to drive-control the engine 22 based on control signals from the hybrid electronic control unit 60 and output data related to the drive state of the engine 22 depending on a need.

Figure 4:
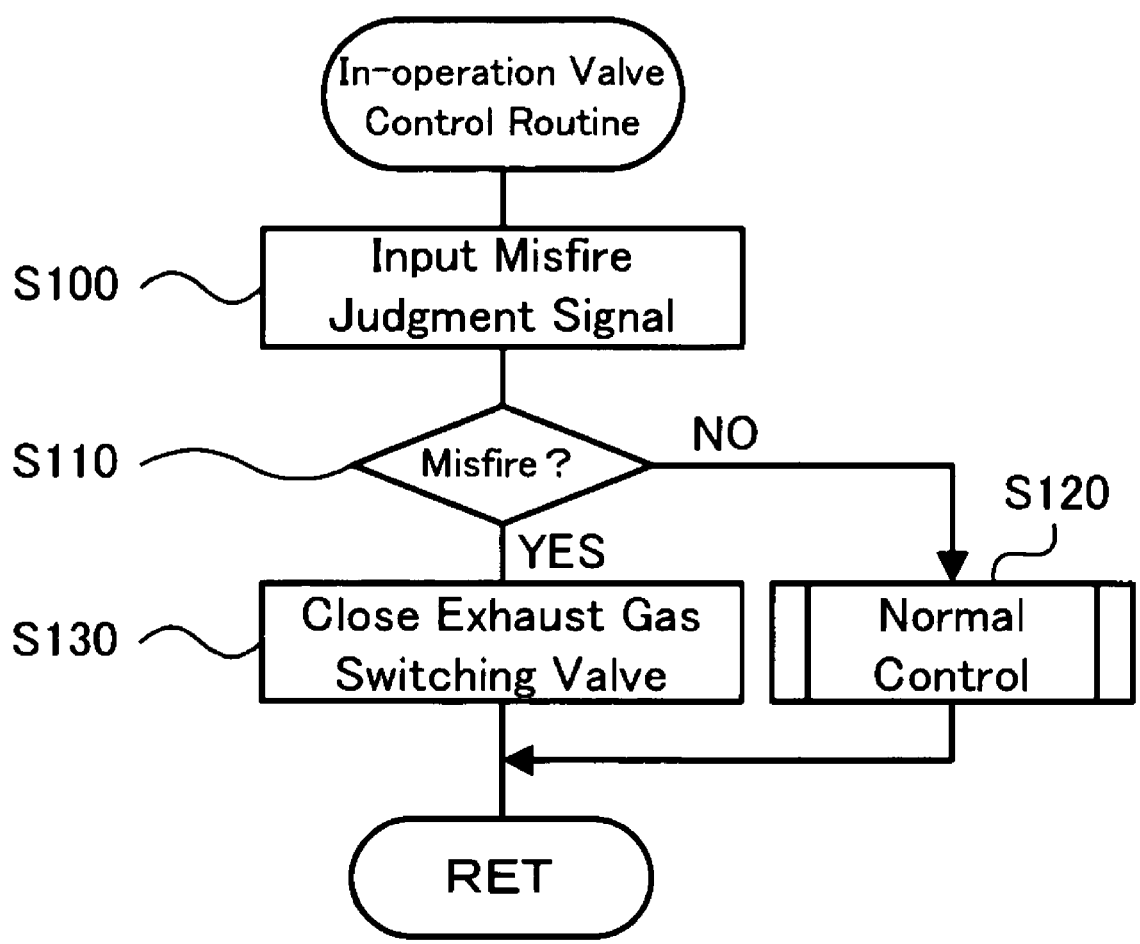
FIG. 4 is a flowchart showing an example of an in-operation valve control routine which is executed by an engine ECU 24.

Next, the operation of the internal combustion engine apparatus 21 of the above configured embodiment, more specifically, the operation of the second purifying device 160 during the operation of the engine 22 will be described. FIG. 4 is a flowchart showing an example of an in-operation valve control routine which is executed by the engine ECU 24 of the embodiment while the engine 22 is being operated. This routine is repeatedly executed in a predetermined interval (such as in a few msec).

When the in-operation valve control routine is executed, the CPU 24a of the engine ECU 24 executes a process of inputting data such as a misfire judgment signal indicating whether or not a misfire occurs in any cylinder of the engine 22 (step S100). Here, the misfire judgment is performed for example by a misfire judgment process (not shown) which is executed by the engine ECU 24. More specifically, the amount of time (30 degree CA time) required for the crankshaft 26 to rotate 30 degrees is calculated based on a signal from the crank position sensor 140. When the difference between an amount of time (30 degree CA time) calculated at an angle which is different from a compression top dead center of each cylinder by a predetermined angle and an amount of time (30 degree CA time) calculated at 360 degree before exceeds a threshold, the cylinder is judged to cause a misfire. The detailed description of the misfire judgment will be omitted since this is not a core of the present invention. According to the internal combustion engine apparatus 21 of the embodiment, the results of misfire judgments are stored in a predetermined area of the RAM 24c as a misfire judgment signal, and the misfire judgment signal is input from the predetermined area of the RAM 24c.

When a misfire judgment signal is input, a judgment is made based on the misfire judgment signal to determine whether or not a misfire occurs in any cylinder of the engine 22 (step S110). If no misfire occurs in any cylinder of the engine 22, a normal control is performed to close or open the exhaust switching valve 170 based on conditions other than a misfire of the engine 22 (step S120), and then the routine terminates processing. If a misfire occurs in any cylinder of the engine 22, the routine sends a drive signal to the actuator 172 to close the exhaust switching valve 170 (step S130), and then the routine terminates processing. In this way, when a misfire occurs in any cylinder of the engine 22, the exhaust switching valve 170 is closed to pass the exhaust gas through the HC adsorbing section 168 to the catalytic purifying section 164. Accordingly, unburned fuel (HC) mixed in the exhaust gas due to a misfire of the engine 22 can be adsorbed in the HC adsorbing section 168.

According to the internal combustion engine apparatus 21 mounted on a hybrid vehicle 20 of the above described embodiment, when a misfire occurs in any cylinder of the engine 22, the exhaust switching valve 170 is closed to pass the exhaust gas through the HC adsorbing section 168 to the catalytic purifying section 164 so that unburned fuel (HC) mixed in the exhaust gas due to a misfire of the engine 22 can be adsorbed in the HC adsorbing section 168. Accordingly, unburned fuel (HC) due to a misfire after the start of the engine is completed can be prevented from being exhausted.

According to the internal combustion engine apparatus 21 of the embodiment, if no misfire occurs in any cylinder of the engine 22, a normal control is performed to close or open the exhaust switching valve 170 based on conditions other than a misfire of the engine 22. However, the present invention is not limited to this embodiment, but if no misfire occurs in any cylinder of the engine 22, the exhaust switching valve 170 may be opened.

The internal combustion engine apparatus 21 of the embodiment includes the first purifying device 152 and the second purifying device 160, but the present invention is not limited to this embodiment, and another embodiment may include only the second purifying device 160 without the first purifying device 152.

In the embodiment, the internal combustion engine apparatus 21 is mounted on a hybrid vehicle 20. However, the present invention is not limited to this embodiment, but the internal combustion engine apparatus may be mounted on any vehicle other than a hybrid vehicle. It is not essential to mount the internal combustion engine apparatus on a vehicle. The present invention may provide a method of controlling an internal combustion engine apparatus.

Here, the relation between the major components of the embodiment and the major components of the invention described in SUMMARY will be described. "Internal combustion engine" in SUMMARY corresponds to an engine 22 in the embodiment. "Exhaust gas purifying unit" corresponds to a second purifying device 160 having a catalytic purifying section 164, an HC adsorbing section 168 and an exhaust switching valve 170. "Misfire judgment unit" corresponds to an engine ECU 24 which executes a misfire judgment (not shown) based on a signal from a crank position sensor 140. "In-misfire switching control unit" corresponds to an engine ECU 24 which executes steps S110 and S130 of an in-operation valve control routine as shown in FIG. 4, in which when a misfire occurs in any cylinder of the engine 22, an exhaust switching valve 170 is closed to pass exhaust gas through the HC adsorbing section 168 to the catalytic purifying section 164. "Second exhaust gas purifying unit" corresponds to a first purifying device 152.

The "internal combustion engine" is not limited to an internal combustion engine for generating mechanical power using a hydrocarbon based fuel such as gasoline and diesel oil, but the present invention may use any type of internal combustion engines including a hydrogen-fueled engine. The internal combustion engine is not limited to a 6 cylinder engine, but the present invention may use any number of cylinders including a 4 cylinder engine, and an 8 cylinder engine. The "exhaust gas purifying unit" is not limited to the second purifying device 160 having the catalytic purifying section 164, the HC adsorbing section 168 and the exhaust switching valve 170, but the present invention may use any units which are located in the exhaust system of the internal combustion engine and which include a catalytic purifying section having a purifying catalyst for purifying an exhaust gas, a fuel gas adsorbing section having a fuel gas adsorbent for adsorbing fuel gases in the exhaust gas and a passage switching section for switching between a first passage for passing the exhaust gas mainly to the catalytic purifying section and a second passage for passing all the exhaust gas through the fuel gas adsorbing section to the catalytic purifying section. The "misfire judgment unit" is not limited to a unit for executing a misfire judgment based on a signal from the crank position sensor 140, but the present invention may use any unit capable of judging whether or not a misfire occurs in any cylinder of the internal combustion engine. The "in-misfire switching control unit" is not limited to a unit in which when a misfire occurs in any cylinder of the engine 22, the exhaust switching valve 170 is closed to pass the exhaust gas through the HC adsorbing section 168 to the catalytic purifying section 164, but the present invention may use any unit capable of controlling a passage switching section such that when a misfire judgment unit judges that a misfire occurs in any cylinder of the internal combustion engine, the passage switching section passes the exhaust gas to the second passage. Accordingly, when no misfire occurs in any cylinder of the engine 22, the exhaust gas may be introduced to a first passage, or the exhaust gas may be introduced to a second passage. It should be noted that in the relation between the major components of embodiments and modifications and the major components of the invention described in SUMMARY, an embodiment is shown as an example of describing the best mode for carrying out the invention described in SUMMARY; thus the major components of embodiments and modifications do not limit the components of the invention described in SUMMARY. In other words, the invention described in SUMMARY shall be construed based on the descriptions given in SUMMARY, and an embodiment is just an example of the invention described in SUMMARY.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2007-084736 filed Mar. 28, 2007 including specification, drawings and claims is incorporated herein by reference in its entirety.

What is claimed is:

1. An internal combustion engine apparatus having an internal combustion engine, the apparatus comprising:
   an exhaust gas purifying unit which is provided in an exhaust system of said internal combustion engine and which includes a purifying catalytic section having a purifying catalyst for purifying an exhaust gas; a fuel gas adsorbing section having a fuel gas adsorbent for adsorbing a fuel gas in the exhaust gas; and a passage switching section for switching between a first passage for passing the exhaust gas mainly to said purifying catalytic section and a second passage for passing all the exhaust gas through said fuel gas adsorbing section to said purifying catalytic section;

a misfire judgment unit for judging whether or not a misfire occurs in any cylinder of said internal combustion engine; and an in-misfire switching control unit for controlling said passage switching section such that when said misfire judgment unit judges that a misfire occurs in any cylinder of said internal combustion engine, said passage switching section passes the exhaust gas to said second passage.

2. An internal combustion engine apparatus according to claim 1, wherein said purifying catalytic section of said exhaust gas purifying unit is located in an entire downstream of an exhaust passage and said fuel gas adsorbing section of said exhaust gas purifying unit is located in a part of an upstream of the exhaust passage; and said passage switching section of said exhaust gas purifying unit is disposed in a remaining portion of the upstream of the exhaust passage of said exhaust gas purifying unit and has a valve for opening and closing said remaining portion.

3. An internal combustion engine apparatus according to claim 1, comprising a second exhaust gas purifying unit located upstream of said exhaust gas purifying unit of the exhaust system of said internal combustion engine and has a purifying catalyst for purifying the exhaust gas.

4. A vehicle comprising:

an internal combustion engine for outputting driving power;

an exhaust gas purifying unit which is located in an exhaust system of said internal combustion engine and which includes a purifying catalytic section having a purifying catalyst for purifying an exhaust gas; a fuel gas adsorbing section having a fuel gas adsorbent for adsorbing a fuel gas in the exhaust gas; and a passage switching section for switching between a first passage for passing the exhaust gas mainly to said purifying catalytic section and a second passage for passing all the exhaust gas through said fuel gas adsorbing section to said purifying catalytic section;

a misfire judgment unit for judging whether or not a misfire occurs in any cylinder of said internal combustion engine; and an in-misfire switching control unit for controlling said passage switching section such that when said misfire judgment unit judges that a misfire occurs in any cylinder of said internal combustion engine, said passage switching section passes the exhaust gas to said second passage.

5. A vehicle according to claim 4, wherein said purifying catalytic section of said exhaust gas purifying unit is located in an entire downstream of an exhaust passage and said fuel gas adsorbing section of said exhaust gas purifying unit is located in a part of an upstream of the exhaust passage; and said passage switching section of said exhaust gas purifying unit is disposed in a remaining portion of the upstream of the exhaust passage of said exhaust gas purifying unit and has a valve for opening and closing said remaining portion.

6. A vehicle according to claim 4, comprising a second exhaust gas purifying unit located upstream of said exhaust gas purifying unit of the exhaust system of said internal combustion engine and has a purifying catalyst for purifying the exhaust gas.

7. A control method of an internal combustion engine apparatus comprising an internal combustion engine; an exhaust gas purifying unit which is located in an exhaust system of said internal combustion engine and which includes a purifying catalytic section having a purifying catalyst for purifying an exhaust gas; a fuel gas adsorbing section having a fuel gas adsorbent for adsorbing a fuel gas in the exhaust gas; and a passage switching section for switching between a first passage for passing the exhaust gas mainly to said purifying catalytic section and a second passage for passing all the exhaust gas through said fuel gas adsorbing section to said purifying catalytic section, the control method controlling said passage switching section such that when a misfire occurs in any cylinder of said internal combustion engine, said passage switching section passes the exhaust gas to said second passage.

* * * * *